United States Patent [19]

Tachikawa et al.

[11] Patent Number: 4,678,767

[45] Date of Patent: Jul. 7, 1987

[54] PROCESS FOR PRODUCING A CATALYST COMPONENT FOR POLYMERIZATION OF OLEFINS

[75] Inventors: Mamoru Tachikawa; Satoshi Ueki; Masato Sakuma, all of Saitama; Chihiro Imai, Kanagawa; Tokuo Makishima, Saitama, all of Japan

[73] Assignee: Toa Nenryo Kogyo Kabushiki Kaisha, Tokyo, Japan

[21] Appl. No.: 802,659

[22] Filed: Nov. 27, 1985

[30] Foreign Application Priority Data

Nov. 30, 1984 [JP] Japan ................................ 59-251740

[51] Int. Cl.$^4$ .............................................. C08F 4/64
[52] U.S. Cl. ...................................... 502/104; 502/112; 502/113; 502/115; 502/116; 502/119; 502/120; 526/97; 526/121; 526/122; 526/129; 526/132; 526/133; 526/137
[58] Field of Search ............... 502/104, 112, 113, 115, 502/116, 119, 120

[56] References Cited

U.S. PATENT DOCUMENTS

| | | | |
|---|---|---|---|
| 3,135,809 | 6/1964 | Bosmajian | 502/103 X |
| 4,199,473 | 4/1980 | Timms | 502/115 X |
| 4,244,838 | 1/1981 | Gessell | 502/115 X |
| 4,246,383 | 1/1981 | Gessell | 502/110 X |
| 4,468,477 | 8/1984 | Caunt et al. | 502/120 X |
| 4,508,843 | 4/1985 | Etherton et al. | 502/115 |
| 4,530,915 | 7/1985 | Esneault et al. | 502/115 |

*Primary Examiner*—Patrick P. Garvin
*Attorney, Agent, or Firm*—M. B. Kurtzman

[57] ABSTRACT

A process for producing a catalyst component for polymerization of olefins which comprises contacting (a) a metal oxide with (b) an organomagnesium compound represented by the formula RMgR' wherein R denotes a hydrocarbyl group and R' denotes a hydrocarbyl group or a halogen atom, contacting the resulting contacting product with (c) carbon dioxide, and further contacting the resulting contact product with (d) a titanium compound. Optionally, the carbon dioxide contacted product can be treated with the halogen-containing compound prior to contact with the titanium compound.

17 Claims, No Drawings

PROCESS FOR PRODUCING A CATALYST COMPONENT FOR POLYMERIZATION OF OLEFINS

DETAILED DESCRIPTION OF THE INVENTION

1. Field of industrial application

The present invention relates to a process for producing a catalyst component for polymerization of olefins.

2. Prior art

In order to improve the catalytic activity per unit weight of catalyst component of Ziegler-Natta catalyst which is effective for the polymerization of olefins, or in order to reduce the amount of residues in the polymer resulting from the catalyst, studies have been made on the catalyst component prepared by supporting a transition metal on a variety of carriers. For example, there is disclosed in Japanese Patent Laid-open No. 65791/1977 a catalyst component for the polymerization of olefins which is prepared by supporting a magnesium compound and titanium compound on a metal oxide carrier such as silica and alumina.

The catalyst components resulting from the previous attempts to have satisfactory catalytic activity, which makes it necessary to increase the concentration and partial pressure of the monomer and comonomer when they are used for the homopolymerization of an olefin or the copolymerization of an olefin with other olefins. This leads to an increase in loss of monomer and comonomer. In addition, such catalyst components provide polymers having a low bulk density.

There is proposed in Japanese Patent Laid-open No. 73009/1982 a catalyst component for the polymerization of olefins which is prepared by supporting a titanium compound or a vanadium compound on a carrier which is a solid reaction product of an organomagnesium compound and carbon dioxide. This catalyst component has a disadvantage in that the magnesium compound constituting the carrier provides more magnesium than is necessary for the catalytic activity and this excess magnesium contaminates the resulting polymer. In addition, it is not adequate for the copolymerization of ethylene and alpha-olefin. Where it is to be used for the production of a copolymer having a low true density, it will be necessary to use a large amount of alpha-olefin.

Problems to be solved by the invention

It is an object of the present invention to provide a catalyst component made from a metal oxide as the starting material, said catalyst component being capable of producing olefin (co)polymers of high bulk density in high yields and being superior in the performance of copolymerization.

Means to solve the problem

Summary of the invention

The present inventors carried out a series of researches which led to the findings that the object of the invention is achieved by the catalyst component produced by contacting a metal oxide with an organomagnesium compound, carbon dioxide, and a titanium compound consecutively.

Accordingly, the gist of the invention resides in a process for producing a catalyst component for polymerization of olefins which comprises contacting (a) a metal oxide with (b) an organomagnesium compound represented by the formula RMgR' (where R denotes a hydrocarbon group and R' denotes a hydrocarbon group or a halogen atom), contacting the resulting contact product with (c) carbon dioxide, and further contacting the resulting contact product with (d) a titanium compound.

Raw materials for catalyst component (A) Metal oxide

The metal oxide used in this invention is an oxide of an element selected from Groups II to IV of the Periodic Table. It includes, for example, $B_2O_3$, $MgO$, $Al_2O_3$, $SiO_2$, $CaO$, $TiO_2$, $ZnO$, $ZrO_2$, $SnO_2$, $BaO$, and $ThO_2$. Preferable among them are $B_2O_3$, $MgO$, $Al_2O_3$, $SiO_2$, $TiO_2$, and $ZrO_2$. Particularly preferable is $SiO_2$. A complex oxide containing them can also be used. It includes, for example, $SiO_2$-$MgO$, $SiO_2$-$Al_2O_3$, $SiO_2$-$TiO_2$, $SiO_2$-$V_2O_5$, $SiO_2$-$Cr_2O_3$, and $SiO_2$-$TiO_2$-$MgO$.

The above-mentioned metal oxides and complex oxides should preferably be anhydrous; however, the inclusion of a trace amount of hydroxide which is normally present may be permissable. In addition, the inclusion of impurities may be permissible if the amount is not so large as to impair the properties of the metal oxide to a great extent. The permissible impurities include oxides, carbonates, sulfates, and nitrates such as sodium oxide, potassium oxide, lithium oxide, sodium carbonate, potassium carbonate, calcium carbonate, magnesium carbonate, sodium sulfate, aluminum sulfate, barium sulfate, potassium nitrate, magnesium nitrate, and aluminum nitrate.

Usually, the metal oxide is used in the form of powder. The size and shape of the powder particles affect the resulting olefin polymer in many cases. They should preferably be controlled as desired. Prior to use, the metal oxide should be calcined at as high a temperature as possible in order to remove any catalyst poison, and the calcined metal oxide should preferably be handled in isolation from the air.

(B) Organomagnesium compound

The organomagnesium compound (abbreviates as organo-Mg hereinafter) used in this invention is represented by the formula RMgR', where R denotes a hydrocarbyl group and R' denotes a hydrocarbyl group or a halogen atom. The hydrocarbon groups represented by R and R' are the same or different alkyl group, cycloalkyl group, aryl group, aralkyl group, alkenyl group, or cycloalkenyl group of carbon number 1 to 16; and the halogen atom represented by R' is chlorine, bromine, fluorine, or iodine.

Illustrative examples of organo-Mg compounds in which R' is a hydrocarbon group include dimethyl Mg, diethyl Mg, ethylmethyl Mg, dipropyl Mg, diisopropyl Mg, ethylpropyl Mg, dibutyl Mg, diisobutyl Mg, di-sec-butyl Mg, di-tert-butyl Mg, butylethyl Mg, butylpropyl Mg, sec-butylethyl Mg, tert-butylisopropyl Mg, sec-butyl-tert-butyl Mg, dipentyl Mg, diisopentyl Mg, ethylpentyl Mg, isopropyl-pentyl Mg, sec-butylpentyl Mg, dihexyl Mg, ethylhexyl Mg, butylhexyl Mg, tertbutylhexyl Mg, (2-ethylbutyl)ethyl Mg, (2,2-diethylbutyl)ethyl Mg, diheptyl Mg, dioctyl Mg, di-2-ethylhexyl Mg, didecyl Mg, decyclohexyl Mg, cyclohexylethyl Mg, butylcyclohexyl Mg, di(methylcyclohexyl) Mg, diphenyl Mg, ethylphenyl Mg, butylphenyl Mg, sec-butylphenyl Mg, ditolyl Mg, ethyltolyl Mg, dixylyl Mg, dibenzyl Mg, benzyl-tert-butyl Mg, diphenethyl Mg, ethylphenethyl Mg, and bis(cyclopentadienyl) Mg and the like.

Illustrative examples in which R' is a halogen metal include methyl Mg chloride, ethyl Mg chloride, n-propyl Mg chloride, i-propyl Mg chloride, n-butyl Mg chloride, i-butyl Mg chloride, n-hexyl Mg chloride, 2-ethylhexyl Mg chloride, phenyl Mg chloride, methyl Mg bromide, ethyl Mg bromide, n-butyl Mg bromide, n-hexyl Mg bromide, phenyl Mg bromide, ethyl Mg iodide, and n-butyl Mg iodide and the like.

The organo-Mg may be a mixture or complex with an organic compound of metal other than magnesium. Such an organometallic compound is represented by the formula $MR_n$ (where M denotes boron, beryllium, aluminum, or zinc; R denotes an alkyl, cycloalkyl, aryl, or aralkyl group of carbon number 1 to 20; and n denotes the valence of metal M). Examples of the organometallic compound include triethyl aluminum, tributyl aluminum, triisobutyl aluminum, triphenyl aluminum, triethyl boron, tributyl boron, diethyl beryllium, diisobutyl beryllium, diethyl zinc, and dibutyl zinc.

Where the organo-Mg forms a mixture or complex compound with an organic compound of a metal other than magnesium, the amount of other metal should be lower than 5 gram-atom, preferably lower than 2 gram-atom for 1 gram-atom of magnesium.

(C) Titanium compound

The titanium compound used in this invention is a compound of divalent, trivalent, or tetravalent titanium. Preferably the titanium compound is represented by the formula $TiX_p(OR^1)_{4-p}$ wherein $0 \leq p \leq 4$, X is a halogen such as, for example chlorine, bromine, and iodine and $R^1$ is an alkyl or aryl group having from 1 to 10 carbon atoms, for example alkyl groups such as methyl, ethyl, propyl, butyl sec-butyl, pentyl, and aryl groups such as phenyl. Examples of the compound include titanium tetrachloride, titanium tetrabromide, trichloroethoxytitanium, trichlorobutoxytitanium, dichlorodiethyoxytitanium, dichlorodibutoxytitanium, dichlorodiphenoxytitanium, chlorotriethoxytitanium, chlorotributoxytitanium, tetrabutoxytitanium, and titanium trichloride. Preferable among them are tetravalent titanium halides as titanium tetrachloride, trichloroethoxytitanium, dichlorodibutoxytitanium, and dichlorodiphenoxytitanium. Particularly preferable is titanium tetrachloride.

Preparation of catalyst component

According to this invention, the catalyst component is prepared by contacting a metal oxide (constituent A) with an organo-Mg (constituent B), and contacting the resulting contact product with carbon dioxide ($CO_2$), and further containing the resulting contact product with a titanium compound (constituent C).

(1) Contacting constituent A with constituent B

The contacting of constituent A with constituent B is accomplished by mixing and stirring or mechanically copulverizing the two constituents in the presence or absence of an inert solvent. Preferably, the contacting may be accomplished by mixing and stirring the two constituents in the presence of an inert solvent.

The inert solvent includes, for example, hydrocarbons such as pentane, hexane, heptane, octane, decane, cyclohexane, benzene, toluene, and xylene; halogenated hydrocarbons such as 1,2-dichloroethane, 1,2-dicloropropane, butyl chloride, isoamyl chloride, bromobenzene, and chlorotoluene; and ethers such as diethyl ether, dibutyl ether, dihexyl ether, diphenyl ether, anisole, and tetrahydrofuran.

Usually the contacting of constituent A with constituent B is performed at 0° to 150° C. for 0.1 to 50 hours. Where the contacting generates heat, the two constituents are slowly mixed at a low temperature at the beginning, and after the mixing is complete, the temperature is raised and the contacting is continued.

One mol of constituent A is brought into contact with 0.01 to 10 mol, preferably 0.1 to 5 mol of constituent B.

The solid contact product (referred to as product I hereinafter) obtained by contacting constituent A with constituent B is then used for the subsequent contacting. If necessary, it may be washed with a proper solvent, such as the above-mentioned inert solvent, prior to the subsequent contacting.

(2) Contacting with $CO_2$

The contacting of product I with $CO_2$ is accomplished by bringing product I, as such in the form of solid or in the form of suspension in an inert solvent such as the above-mentioned hydrocarbon or in a halogenated hydrocarbon, into contact with $CO_2$.

Usually the contacting is accomplished at 0° to 100° C. for 0.1 to 10 hours. The contacting may be accomplished by blowing $CO_2$ gas or a $CO_2$-containing gas (e.g., a mixture of $CO_2$ and an inert gas such as nitrogen and argon or an inert hydrocarbon gas such as methane and ethane) into the system in which there is product I or a suspension thereof. The contacting may also be accomplished in an atmosphere of $CO_2$ or $CO_2$-containing gas. In the former case, 0.1 to 100 gram-mol, preferably 0.5 to 50 gram-mol, of $CO_2$ is blown for 1 gram-atom of magnesium in product I. In the latter case, the atmosphere of $CO_2$ or $CO_2$-containing gas may be pressurized so that the partial pressure of $CO_2$ reaches about 50 atm.

The solid product obtained by contacting product I with $CO_2$ is referred to as product II hereinafter. Product II is subsequently brought into contact with a titanium compound. Prior to the contacting, it may be washed with a proper cleaning agent such as the above-mentioned hydrocarbon, followed by drying.

Alternatively, product II may be brought into contact with a halogen or a halogen-containing compound prior to the contacting with a titanium compound. The halogen includes chlorine and bromine, and the halogen-containing compound includes halides of metallic or non-metallic elements (e.g., $SiCl_4$, $SnCl_4$, $AlCl_3$, $BCl_3$, $SbCl_3$, $BI_3$, $PCl_3$, $PCl_5$, and $HSiCl_3$); hydrogen halides such as HCl, HBr, and HI; oxyhalides of non-metallic elements (e.g., $SO_2Cl_2$, $SOCl_2$, NOCl, and $POCl_3$; and $C_1$–$C_{10}$ halogenated hydrocarbons (e.g., carbon tetrachloride, 1,2-dichloroethane, 1,1,2-trichloroethylene, hexachloroethane, 1,2-dichloropropane, octachloropropane, hexachlorocyclohexane, dichlorobenzene, and hexachlorobenzene).

The halogen or the halogen-containing compound to be used for the optional contacting with product II is designated as constituent D hereinafter. The contacting of product II with constituent D may be accomplished by mixing and stirring them in the presence or absence of the above-mentioned inert hydrocarbon. Usually the contacting is accomplished at 0° to 150° C. for 0.5 to 10 hours. Constituent D should preferably be used in an amount of 0.005 to 10 gram-mol, particularly 0.1 to 2 gram-mol, for 1 gram-atom of magnesium in product II. The solid product obtained by this contacting procedure may be washed with an inert solvent such as the above-mentioned hydrocarbon, followed by drying, as in the case of product II, prior to the subsequent contacting with a titanium compound (constituent C).

(3) Contacting with constituent C

Product II which has or has not been contacted with constituent D is subsequently brought into contact with constituent C. This contacting is accomplished by mechanically copulverizing them or mixing and stirring them in the presence or absence of an inert solvent such as the above-mentioned hydrocarbon. The preferred procedure is to mix and stir them in the presence of an inert solvent.

In the contacting procedure, constituent C is used in an amount greater than 0.01 gram-mol, preferably 0.1 to 10 gram-mol, for 1 gram-atom of magnesium in product II. The contacting is accomplished at 0° to 200° C. for 0.5 to 20 hours, preferably at 60° to 150° C. for 1 to 5 hours.

The contacting of product II with constituent C may be accomplished twice or more in the same procedure as mentioned above. The contact product obtained by the first contacting may be washed with an inert solvent, if necessary, prior to the second contacting.

In the way mentioned above, the catalyst component of this invention can be produced. If necessary, it may be washed with an inert hydrocarbon such as hexane, heptane, octane, cyclohexane, benzene, toluene, and xylene, and the washed one may be dried.

The catalyst component obtained according to the process of this invention is composed of 20 to 80 wt % of metal atoms derived from constituent A, 0.5 to 10 wt % of magnesium atoms, 0.1 to 10 wt % of titanium atoms, and 0.5 to 40 wt % of halogen atoms. It has a narrow particle size distribution and a uniform particle size.

Catalyst for polymerization of olefins

The catalyst component of this invention is combined with an organic compound of metals of Groups I to III of the Periodic Table to be made into a catalyst for homopolymerization of an olefin or for copolymerization of an olefin with another olefin.

Organic compounds of metals of Groups I to III

The organometallic compound for this purpose includes organic compounds of lithium, magnesium, calcium, zinc, and aluminum. Preferable among them are organoaluminum compounds which are represented by the formula $R_n{}^2AlX_{3-n}$ (where $R^2$ is an alkyl group or aryl group; X is a halogen atom, alkoxy group, or hydrogen atom; and n is a number in the range of $1 \leq n \leq 3$). Preferred examples include $C_1$ to $C_{18}$, more suitably $C_2$ to $C_6$ alkyl aluminum compounds and mixtures thereof and complex compounds thereof such as trialkyl aluminum, dialkyl aluminum monohalide, monoalkyl aluminum dihalide, alkyl aluminum sesquihalide, dialkyl aluminum monoalkoxide, and dialkyl aluminum monohydride. Their examples include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among these compounds is trialkyl aluminum, particularly triethyl aluminum and triisobutyl aluminum. The trialkyl aluminum may be used in combination with other organoaluminum compounds such as commercially available diethyl aluminum chloride, ethyl aluminum dichloride, ethyl aluminum sesquichloride, diethyl aluminum ethoxide, and diethyl aluminum hydride, or a mixture thereof or a complex compound thereof.

It is also possible to use an organoaluminum compound in which two or more aluminum atoms are connected through an oxygen atom or nitrogen atom. Examples of such compounds are $(C_2H_5)_2AlOAl(C_2H_5)_2$, $(C_4H_9)_2AlOAl(C_4H_9)_2$, and

The organic compounds of metals other than aluminum include diethyl magnesium, ethyl magnesium chloride, diethyl zinc, $LiAl(C_2H_5)_4$, and $LiAl(C_7H_{15})_4$.

The organometallic compound may be used alone or in combination with an electron donor compound which is a carboxylic ester, organosilicon compound, or a compound containing a hetero atom such as nitrogen, sulfur, oxygen, and phosphorus.

Examples of the carboxylic esters include butyl formate, ethyl acetate, butyl butyrate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexanecarbonate, methyl benzoate, ethyl benzoate, methyl p-toluylate, ethyl p-tertiarybutylbenzoate, ethyl p-anisate, ethyl alpha-naphthoate, isobutyl alphanaphthoate, ethyl cinnamate, monomethyl phthalate, monobutyl phthalate, dibutyl phthalate, diisobutyl phthalate, dihexyl phthalate, dioctyl phthalate, di-2-ethyl-hexyl phthalate, diaryl phthalate, diphenyl phthalate, diethyl isophthalate, diisobutyl isophthalate, diethyl terephthalate, dibutyl terephthalate, diethyl naphthalate, and dibutyl naphthalate, triethyl trimellitate, tributyl trimellitate, tetramethyl pyromellitate, tetraethyl pyromellitate, and tetrabutyl pyromellitate.

Examples of the organosilicon compounds include tetramethoxysilane, tetraethoxysilane, tetrabutyoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, aryltrimethoxysilane, phenyltrimethoxysilane, phenyltriethoxysilane, benzyltriphenoxysilane, methyltriaryloxysilane, dimethyldimethoxysilane, dimethyldiethoxysilane, dimethyldiisopropoxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diaryldipropoxysilane, diphenyldiaryloxysilane, methylphenyldimethoxysilane, and chlorophenyldiethoxysilane.

Examples of the electron donor compound containing a hetero atom are given below. Those which contain a nitrogen atom include 2,2,6,6-tetramethylpiperidine, 2,6-dimethylpiperidine, 2,6-diethylpiperidine, 2,6-diisopropylpiperidine, 2,2,5,5-tetramethylpyrrolidone, 2,5,-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetonitrile, aniline, paratoluidine, orthotoluidine, metatoluidine, triethylamine, diethylamine, dibutylamine, tetramethylenediamine, and tributylamine. Those which contain a sulfur atom include thiophenol, thiophene, ethyl 2-thiophenecarboxylate, ethyl 3-thiophenecarboxylate, 2-methylthiophene, methylmercaptan, ethylmercaptan, isopropylmercaptan, butyl mercaptan, diethyl thioether, diphenylthioether, methyl behzenesulfonate, methyl sulfite, and ethyl sulfite. Those which contain an oxygen atom include tetrahydrofuran, 2-methyltetrahydrofuran, 3-methyltetrahydrofuran, 2-ethyltetrahydrofuran, dioxane, dimethyl ether, diethyl ether, dibutyl ether, diisoamyl ether, diphenyl ether, anisole, acetophenone, acetone, methyl ethyl ketone, acetyl acetone, ethyl 2-furoate, isoamyl 2-furoate, methyl 2-furoate, and propyl 2-furoate. Those which contain a phosphorus atom include triphenyl phosphine, tributyl phosphine, triphenyl phosphite, tribenzyl phosphite, diethyl phosphate, and diphenyl phosphate.

These electron donor compounds may be used in combination with one another. In addition, these electron donor compounds may be used when the catalyst component is used in combination with an organometallic compound. Alternatively, they may be used after previous contact with an organometallic compound.

The organometallic compound is used in an amount of 1 to 2000 gram-mol, particularly 20 to 500 gram-mol, for 1 gram-atom of titanium in the catalyst component of this invention.

The ratio of the organometallic compound to the electron donor compound is such that one mol of the electron donor compound matches 0.1 to 40 gram-atom, preferably 1 to 25 gram-atom of metal in terms of aluminum in the organometallic compound.

Polymerization of olefins

The catalyst composed of the catalyst component obtained as mentioned above and an organometallic compound (and an electron donor compound) is useful as a catalyst for homopolymerization of a monoolefin of carbon number 2 to 10 and copolymerization of a monoolefin with another monoolefin or a diolefin of carbon number 3 to 10. It exhibits outstanding performance in homopolymerization of ethylene or random or block copolymerization of ethylene with alphaolefins of carbon number 3 to 10, such as propylene, 1-butene, 4-methyl-1-pentene, 1-hexene, and 1-octene.

The polymerization may be performed in either gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene; or in the liquid monomer. The polymerization temperature is usually $-80°$ C. to $+150°$ C., preferably 20° to 120° C. The polymerization pressure is 1 to 60 atm. The molecular weight modification of the resulting polymer is accomplished by the aid of hydrogen or any known molecular weight modifier present in the system. In the case of copolymerization, the quantity of an olefin to be copolymerized is usually less than 30 wt %, particularly 0.3 to 15 wt %, based on the principal olefin. The polymerization with the catalyst system of this invention may be performed continuously or batchwise under the commonly used conditions. The copolymerization may be accomplished in one step or in two or more steps.

Effect of the invention

The catalyst component of this invention is effective as a component of the catalyst for producing high-density polyethylene polypropylene, and copolymers of ethylene with an alpha-olefin such as propylene, 1-butene, 4-methyl-1-pentene, 1-hexene, and 1-octene.

The polymerization catalyst containing the catalyst component of this invention has a high polymerization activity. In addition, it provides (co)polymers having a high bulk density and a narrow particle size distribution. It provides (co)polymers containing a reduced amount of injurious materials resulting from the catalyst. The catalyst component of this invention exhibits high performance in copolymerization. In the case of copolymerization of ethylene with an alpha-olefin, it provides a copolymer with a high content of alpha-olefin or with a low true density even when the amount of alpha-olefin is reduced in copolymerization.

EXAMPLES

The invention is illustrated with the following examples and application examples, in which percent (%) is by weight, unless otherwise indicated.

The melt index (MI) of the resulting polymer was measured according to ASTM D1238. The bulk density was measured according to ASTM D1895-69, method A. The heptane insolubles (HI) which indicate the ratio of the crystalline phase in the polymer are the amount of the polymer which remains undissolved when the polymer is extracted with boiling n-heptane for 6 hours in a Soxhlet apparatus of improved type. The true density was measured according to JIS K7112-D that employs specimens prepared according to JIS K6760 and water-isopropanol mixture. The PSD index indicating the particle size distribution of the polymer powder is defined by the following equation.

PSD index=Log (A/B)

where A is the particle diameter ($\mu$m) at 90% of cumulative oversize distribution and B is the particle diameter (μm) at 10% of cumulative oversize distribution measured with a vibrating microclassifier.

EXAMPLE 1

Contacting of silicon dioxide with n-butylethyl magnesium

In a 200-ml flask equipped with a stirrer, with the air therein replaced with nitrogen, was placed 5 g of silicon dioxide ($SiO_2$) [prepared by calcining G-952, a product of Davison Co., having a specific surface area of 302 m$^2$/g, a pore volume of 1.54 cm$^3$/g, and an average pore radius of 204 A, in a nitrogen stream at 200° C. for 2 hours and further at 700° C. for 5 hours] and 20 ml of 20% solution of n-butyl-ethyl magnesium (BEM) in n-heptane (MAGALA BEM, a product of Texas Alkyls Co., containing 26.8 mmol of BEM). After stirring at 90° C. for 1 hour, the supernatant liquid was discarded by decantation and the solid substance was washed three times with 50 ml of n-hexane at 50° C.

Contacting with carbon dioxide

To the solid substance obtained in the preceding step was added 50 ml of n-hexane. 0.6 liters of carbon dioxide was blown into the suspension with stirring at 50° C. over 1 hour. The supernatant liquid was discarded and the remaining solid substance was washed three times with 50 ml of n-hexane at 50° C.

Contacting with titanium tetrachloride

To the solid substance obtained in the preceding step was added 50 ml of toluene and 5 ml of titanium tetrachloride, followed by stirring at 90° C. for 2 hours. The supernatant liquid was discarded and the remaining solid substance was washed five times with 100 ml of n-hexane, followed by drying in vacuo at 65° C. for 1 hour. Thus there was obtained 5.9 g of catalyst component, which was found to contain 4.31% of magnesium, 4.50% of titanium, and 17.8% of chlorine.

EXAMPLE 2

A solid substance was obtained by contacting $SiO_2$ with BEM as in Example 1. This solid substance and 50 ml of n-hexane were placed in a glass autoclave, and carbon dioxide was forced into the autoclave. Contacting with carbon dioxide was performed with stirring under a pressure of 2.8 atm at 80° C. for 2 hours. The resulting solid substance was washed three times with 50 ml of n-heptane at 50° C. Then, 40 ml of toluene and 0.6 ml of titanium tetrachloride were added, followed by stirring at 90° C. for 1 hour. The solid substance was washed three times with 100 ml of n-hexane at 50° C., followed by drying in vacuo at 65° C. for 1 hour. Thus there was obtained a catalyst component, which was found to contain 4.21% of magnesium, 3.71% of titanium, and 16.1% of chlorine.

EXAMPLE 3

The same procedure as in Example 2 was repeated except that contacting with silicon tetrachloride was performed as follows before the contacting with titanium tetrachloride.

To the solid substance used for contacting with titanium tetrachloride were added 1.5 ml of silicon tetrachloride and 20 ml of n-heptane, followed by stirring at 70° C. for 2 hours. The solid substance was washed three times with 50 ml of n-hexane at 50° C.

Thus there was obtained a catalyst component, which was found to contain 4.75% of magnesium, 2.58% of titanium, and 16.1% of chlorine.

EXAMPLE 4

The same procedure as in Example 1 was repeated except that the BEM solution used for contacting with $SiO_2$ was replaced by 20 ml of 2.8 mol solution of methyl magnesium chloride in tetrahydrofuran. The resulting solid substance was washed three times with 20 ml of tetrahydrofuran at 25° C. Then, 40 ml of n-heptane was added and stirring was performed at 70° C. for 2 hours under a pressure of 2.8 atm of carbon dioxide. The solid substance was washed three times with 50 ml of n-heptane at 50° C. Then, 40 ml of toluene and 0.5 ml of titanium tetrachloride were added, followed by stirring at 90° C. for 2 hours. The solid substance was washed three times with 100 ml of n-heptane at 25° C., followed by drying in vacuo at 65° C. for 1 hour.

Thus there was obtained a catalyst component, which was found to contain 4.81% of magnesium, 4.68% of titanium, and 18.2% of chlorine.

COMPARATIVE EXAMPLE 1

A catalyst component was prepared as in Example 1 except that the contacting with carbon dioxide was not performed. Thus there was obtained a catalyst component, which was found to contain 3.86% of magnesium, 10.1% of titanium, and 32.6% of chlorine.

APPLICATION EXAMPLE 1

Copolymerization of ethylene with 1-butene

In a 1.5-liter autoclave (made of SUS-316) equipped with a stirrer were placed under a nitrogen atmosphere 700 ml of isobutane, 0.7 mmol of triisobutyl aluminum, and a sealed glass ampoule containing 66.0 mg of the catalyst component prepared in Example 1. The reaction system was heated to 80° C. Hydrogen was introduced until the partial pressure of hydrogen reached 1.5 kg/cm$^2$. As soon as the glass ampoule was broken by rotating the stirrer and the stirring was started, 30 g of 1-butene was forced into the autoclave. Polymerization was performed for 2 hours by continuously supplying ethylene so that the total pressure was kept constant in the polymerization system.

After the polymerization was complete, unreacted ethylene and 1-butene and isobutane were purged. The resulting white polymer powder was dried in vacuo at 70° C. for 10 hours. There was obtained 237.6 g of white ethylene-1-butene copolymer having an MI of 1.76 g/10 min, a bulk density of 0.37 g/cc, and a true density of 0.9240 g/cc. The specific catalytic activity (Ec) was 360 g/g-catalyst component·$hr$·ethylene partial pressure, and Et was 8.0 kg/g-titanium·$hr$·ethylene partial pressure.

APPLICATION EXAMPLES 2 TO 5

Copolymerization of ethylene with 1-butene was carried out in the same manner as in Application Example 1 except that the catalyst components obtained in Examples 2 to 4 and Comparative Example 1 were used. The results are shown in Table 1.

APPLICATION EXAMPLE 6

Polymerization of ethylene

Polymerization of ethylene was performed in the same manner as in Application Example 1 except that the amount of the catalyst component obtained in Example 1 was changed to 87.0 mg, the partial pressure of hydrogen was changed to 2.0 kg/cm$^2$, and 1-butene was not used. There was obtained 82.6 g of polyethylene powder having a bulk density of 0.39 g/cc and an MI of 0.19 g/10 min.

(Ec=94.9 g/g-cat·hr·atm., Et=2.11 kg/g-Ti·hr·atm.)

APPLICATION EXAMPLE 7

Polymerization of ethylene was performed in the same manner as in Aoplication Example 6 except that the catalyst component obtained in Comparative Example 1 was used. There was obtained polyethylene powder having a bulk density of 0.34 g/cc and an MI of 0.25 g/10 min.

(Ec=134 g/g-cat·hr·atm., Et=1.33 kg/g-Ti·hr·atm.)

APPLICATION EXAMPLE 8

Polymerization of propylene

Into a 1.5-liter autoclave equipped with a stirrer was charged under a nitrogen atmosphere a catalyst composed of the catalyst component obtained in Example 1, triethylaluminum (TEAL) solution (1 mol/liter) in n-heptane, and phenyltriethoxysilane (PES) solution (0.1 mol/liter) in n-heptane. [The amount of the catalyst component was 53.3 mg. The amount of TEAL solution was equivalent to 200 gram-atom of aluminum for 1 gram-atom of titanium in the catalyst component. The amount of PES solution was equivalent to 0.1 gram-mol of PES for 1 gram-atom of aluminum in the TEAL solution. These three components were mixed and allowed to stand for 5 minutes before use.] Then, 0.1 liters of hydrogen gas as a molecular weight modifier and 1 liter of liquid propylene were forced into the autoclave. The reaction system was heated to 70° C., at which polymerization of propylene was carried out for 1 hour.

After the polymerization was complete, unreacted propylene was purged. There was obtained 32.6 g of white polypropylene powder having an HI of 91.1% and an MI of 8.8 g/10 min.

Kc=611 (amount (in g) of polymer formed per g of the catalyst component)

Kt=13.6 (amount (in kg) of polymer formed per g of titanium in the catalyst component)

APPLICATION EXAMPLE 9

Polymerization of propylene was carried out in the same manner as in Application Example 8 except that the catalyst component obtained in Comparative Example 1 was used. There was obtained polypropylene powder having an HI of 84.5% and an MI of 9.1 g/10 min.

Kc=230 g/g-catalyst component
Kt=2.3 kg/g-Ti

What is claimed is:

1. A catalyst component for the polymerization of olefins said catalyst component obtained by contacting (a) a metal oxide of a metal selected from Groups II to IV of the Periodic Table and (b) an organomagnesium compound represented by the formula RMgR' wherein R represents a hydrocarbyl group selected from an alkyl group, cycloalkyl group, aryl group, arylalkyl group, alkenyl group, or cycloalkenyl group having from 1 to 16 carbon atoms, R' represents a hydrocarbyl group selected from an alkyl group, cycloalkyl group, aryl group, arylalkyl group, alkenyl group, or cycloalkenyl group having from 1 to 16 carbon atoms and may be the same or different from R, or a halogen atom selected from chlorine, bromine, fluorine, or iodine, contacting the contact product therefrom with (c) carbon dioxide and contacting the contact product therefrom with (d) a titanium compound represented by the formula TiX$_p$(OR$^1$)$_{4-p}$ wherein $0 \leq p \leq 4$, X is a halogen and R$^1$ is an alkyl or aryl group having from 1 to 10 carbon atoms.

2. The catalyst component in accordance with claim 1 wherein the (a) metal oxide is selected from B$_2$O$_3$, MgO, Al$_2$O$_3$, SiO$_2$, CaO, TiO$_2$, ZnO, ZrO$_2$, SnO$_2$, BaO, and ThO$_2$.

3. The catalyst component in accordance with claim 2 wherein the (a) metal oxide is SiO$_2$ and the (d) titanium compound is titanium tetrachloride.

4. The catalyst component in accordance with claim 1 wherein the carbon dioxide treated product is contacted with a halogen or halogen-containing compound prior to contacting with the titanium compound.

5. The catalyst component in accordance with claim 4 wherein the halogen-containing compound is selected from SiCl$_4$, SnCl$_4$, AlCl$_3$, BCl$_3$, SbCl$_3$, BiCl$_3$, PCl$_3$, PCl$_5$, HSiCl$_3$, HCl, HBr, HI, SO$_2$Cl$_2$, SOCl$_2$, NOCl, POCl$_3$, and C$_1$-C$_{10}$ halogenated hydrocarbons.

6. The catalyst component in accordance with claim 4 wherein the halogen-containing compound is SiCl$_4$.

7. A catalyst system for the polymerization of olefins said catalyst system comprising,
   (A) a titanium-containing catalyst component obtained by contacting (a) a metal oxide of a metal selected from Groups II to IV of the Periodic Table and (b) an organomagnesium compound represented by the formula RMgR' wherein R represents a hydrocarbyl group selected from an alkyl group, cycloalkyl group, aryl group, arylalkyl group, alkenyl group, or cycloalkenyl group having from 1 to 16 carbon atoms, R' represents a hydrocarbyl group selected from an alkyl group, cycloalkyl group, aryl group, arylalkyl group, alkenyl group, or cycloalkenyl group having from 1 to 16 carbon atoms and may be the same or different from R, or a halogen atom selected from chlorine, bromine, fluorine, or iodine, contacting the

TABLE 1

| Application Example | Catalyst component | Ec* | Et** | Bulk density (g/cc) | MI (g/10 min) | True density (g/cc) | PSD index |
|---|---|---|---|---|---|---|---|
| 1 | Example 1 | 360 | 8.0 | 0.37 | 1.76 | 0.9240 | 0.244 |
| 2 | Example 2 | 414 | 11.2 | 0.37 | 0.36 | 0.9263 | 0.239 |
| 3 | Example 3 | 317 | 12.3 | 0.38 | 0.34 | 0.9257 | 0.230 |
| 4 | Example 4 | 250 | 5.3 | 0.40 | 0.74 | 0.9250 | 0.251 |
| 5 | Comparative Example 1 | 285 | 2.8 | 0.28 | 0.27 | 0.9283 | 0.336 |

*g/g-cat · hr · atm
**kg/g-Ti · hr · atm contact product therefrom with (c) carbon dioxide and contacting the contact product therefrom with (d) a titanium compound represented by the formula $TiX_p(OR^1)_{4-p}$ wherein $0 \leq p \leq 4$, X is a halogen and $R^1$ is an alkyl or aryl group having from 1 to 10 carbon atoms, (B) a cocatalyst selected from organometallic compounds of metals of Groups I to III.

8. The catalyst in accordance with claim 7 wherein the organometallic compound is selected from organoaluminum compounds represented by the formula $R_n^2AlX_{3-n}$ wherein $1 \leq n \leq 3$, $R^2$ is an alkyl or aryl group having from 1 to 18 carbon atoms and X is a halogen atom.

9. A catalyst system in accordance with claim 7 wherein the (a) metal oxide is selected from $B_2O_3$, MgO, $Al_2O_3$, $SiO_2$, CaO, $TiO_2$, ZnO, $ZrO_2$, $SnO_2$, BaO, and $ThO_2$.

10. A catalyst system in accordance with claim 9 wherein the (a) metal oxide is $SiO_2$ and the (d) titanium compound is titanium tetrachloride.

11. A catalyst system in accordance with claim 7 wherein the carbon dioxide treated product is contacted with a halogen or halogen-containing compound prior to contacting with the titanium compound.

12. The catalyst system in accordance with claim 11 wherein the halogen-containing compound is selected from $SiCl_4$, $SnCl_4$, $AlCl_3$, $BCl_3$, $SbCl_3$, $BiCl_3$, $PCl_3$, $PCl_5$, $HSiCl_3$, HCl, HBr, HI, $SO_2Cl_2$, $SOCl_2$, NOCl, $POCl_3$, and $C_1$–$C_{10}$ halogenated hydrocarbons.

13. The catalyst system in accordance with claim 12 wherein the halogen-containing compound is $SiCl_4$.

14. A process for producing a catalyst component for the polymerization of olefins which comprises contacting (a) a metal oxide of a metal selected from Groups II to IV of the Periodic Table and (b) an organomagnesium compound represented by the formula RMgR' wherein R represents a hydrocarbyl group selected from an alkyl group, cycloalkyl group, aryl group, arylalkyl group, alkenyl group, or cycloalkenyl group having from 1 to 16 carbon atoms, R' represents a hydrocarbyl group selected from an alkyl group, cycloalkyl group, aryl group, arylalkyl group, alkenyl group, or cycloalkenyl group having from 1 to 16 carbon atoms and may be the same or different from R, or a halogen atom selected from chlorine, bromine, fluorine, or iodine, contacting the contact product therefrom with (c) carbon dioxide and contacting the contact product therefrom with (d) a titanium compound represented by the formula $TiX_p(OR^1)_{4-p}$ wherein $0 \leq p \leq 4$, X is a halogen and $R^1$ is an alkyl or aryl group having from 1 to 10 carbon atoms.

15. The process in accordance with claim 14 wherein the carbon dioxide treated product is contacted with a halogen or halogen-containing compound prior to contacting with the titanium compound.

16. A catalyst component for the homopolymerization of ethylene or the copolymerization of ethylene with a alpha-olefin having from 3 to 10 carbon atoms, said catalyst component obtained by contacting (a) silica and (b) an organomagnesium compound represented by the formula RMgR' wherein R represents a hydrocarbyl group selected from an alkyl group, cycloalkyl group, aryl group, arylalkyl group, alkenyl group, or cycloalkenyl group having from 1 to 16 carbon atoms, R' represents a hydrocarbyl group selected from an alkyl group, cycloalkyl group, aryl group, arylalkyl group, alkenyl group, or cycloalkenyl group having from 1 to 16 carbon atoms and may be the same or different from R, or a halogen atom selected from chlorine, bromine, fluorine, or iodine, contacting the contact product therefrom with (c) carbon dioxide and contacting the contact product therefrom with (d) a titanium compound represented by the formula $TiX_p(OR^1)_{4-p}$ wherein $0 \leq p \leq 4$, X is a halogen and $R^1$ is an alkyl or aryl group having from 1 to 10 carbon atoms.

17. A catalyst system for the homopolymerization of ethylene or the copolymerization of ethylene with an alpha-olefin having from 3 to 10 carbon atoms, said catalyst system comprising, (A) a titanium-containing catalyst component obtained by contacting (a) silica and (b) an organomagnesium compound represented by the formula RMgR' wherein R represents a hydrocarbyl group selected from an alkyl group, cycloalkyl group, aryl group, arylalkyl group, alkenyl group, or cycloalkenyl group having from 1 to 16 carbon atoms, R' represents a hydrocarbyl group selected from a alkyl group, cycloalkyl group, aryl group, arylalkyl group, alkenyl group, or cycloalkenyl group having from 1 to 16 carbon atoms and may be the same or different from R, or a halogen atom selected from chlorine, bromine, fluorine, or iodine, contacting the contact product therefrom with (c) carbon dioxide and contacting the contact product therefrom with (d) a titanium compound represented by the formula $TiX_p(OR^1)_{4-p}$ wherein $0 \leq p \leq 4$, X is a halogen and $R^1$ is an alkyl or aryl group having from 1 to 10 carbon atoms, (B) a cocatalyst selected from organometallic compounds of metals of Groups I to III.

* * * * *